United States Patent [19]

Mikami

[11] Patent Number: 5,424,792
[45] Date of Patent: Jun. 13, 1995

[54] CAMERA WITH PLURAL LENSES FOR TAKING SEQUENTIAL EXPOSURES

[75] Inventor: Yuji Mikami, Saitama, Japan

[73] Assignee: Fuji Photo Film Co., Ltd., Kanagawa, Japan

[21] Appl. No.: 186,119

[22] Filed: Jan. 25, 1994

[30] Foreign Application Priority Data

Jan. 25, 1993 [JP] Japan .................. 5-009944
Jan. 25, 1993 [JP] Japan .................. 5-009945

[51] Int. Cl.6 ............................................. G03B 1/00
[52] U.S. Cl. .................................................. 354/120
[58] Field of Search ............... 354/110, 114, 120, 125

[56] References Cited

U.S. PATENT DOCUMENTS 5,264,882 11/1993 Kameyama et al. ............... 354/120

Primary Examiner—Howard B. Blankenship
Attorney, Agent, or Firm—Young & Thompson

[57] ABSTRACT

A sequential taking camera has four taking lenses. A stationary plate is disposed behind the lenses. Four stationary openings are formed in the stationary plate, each behind a respective one of the lenses. Two rotary disks are disposed behind the lenses, and rotated in response to a single operation of a shutter release button, so as to render the four stationary openings effective sequentially. A shutter plate is disposed behind the lenses in slidable fashion. Four shutter slits are formed in the shutter plate and each is associated with a respective one of the four stationary openings. When the shutter plate is slid, the slits move past the stationary openings respectively associated therewith, and open and then close the stationary openings thus rendered effective. Thus four imaging sub-frames are created consecutively on a photographic film. In a preferred embodiment, a pin is disposed on either disk. A first retaining bent portion is associated with the release button, and receives the pin, when the shutter button remains inactive, and retains the disks against the bias of a spiral spring mechanism. When the button is depressed, the pin is released from the first retaining portion. A second retaining bent portion associated with the shutter button comes in turn into the path of the pin, receives the pin after being released from the first retaining portion and during rotation of the disks, and retains the disks substantially in an initial rotational position against the spiral spring bias.

21 Claims, 12 Drawing Sheets

CAMERA WITH PLURAL LENSES FOR TAKING SEQUENTIAL EXPOSURES

BACKGROUND OF THE INVENTION

1. Field of the Invention

The present invention relates to a camera adapted to take photographs consecutively by taking an identical subject a plurality of times at a predetermined time interval upon one release of a shutter. More particularly, the present invention relates to an improvement of a shutter device for a consecutive taking camera.

2. The Prior Art

Consecutive photograph taking is very convenient in the field of sports and the like, because the position of a subject at various times in a photographic sequence can be recorded as still images.

A consecutive taking camera "Rensha Cardia Byun" (trademark) is marketed by Fuji Photo Film Co., Ltd., the assignee of the present application. In this camera, eight stationary openings are arranged behind respectively associated taking lenses. Eight consecutive scenes are sequentially taken on eight imaging sub-frames, of which four sub-frames constitute an imaging frame of a panoramic size, and all of which constitute a set of two panoramically combined imaging frames. To provide a panoramic frame (36× 13 mm), upper and lower portions of a 35 mm full size frame (36×24 mm) are masked along the two longer sides. The camera incorporates a shutter device having two rotatable disks. Slits in the disks pass behind eight stationary openings so as to record eight successive images at the different points of the film.

Such a consecutive taking camera has a stopping motor which drives the two disks. At the time of exposure through the disks, the disks are controlled to rotate at high speed. During intervals between the exposures, the disks are controlled to rotate at low speed. It is intended in the camera to record a moving subject in such a form that the motion of the subject is apparently stopped, and to cover a photographic sequence of duration from one to two seconds for recording the eight sub-frames.

In such a consecutive taking camera having a stepping motor, it is possible to predetermine shutter speed and intervals between exposures of the sub-frames as desired. However, there are serious problems of structural complication due to the circuitry of the camera inclusive of the stepping motor, battery, microcomputer and controller. The camera tends to be costly and large.

It is also known in the same field of construct a consecutive taking camera in less costly fashion: a single rotor having an opening is rotated by the bias of a spring, and effects four exposures consecutively. The spring for the rotor is charged during the winding of the film: the film, during winding, derives a sprocket wheel whose rotation charges the spring. When a shutter device is released, the recovery force of the spring causes the rotor to make one rotation.

In the latter known camera, however, high shutter speed and long duration of photographic sequence cannot both be achieved, because a spring having a high recovery force would inevitably shorten the intervals between exposures as well as producing a high shutter speed. A simple spring, in general, has a tendency to progressively decrease in recovery forces as recovery proceeds. Even the single rotation of the rotor considerably changes in speed between the beginning and the end of the rotation, so that there takes place a variation between the sub-frames as to the amount of light received during exposures.

Another problem of the same camera arises when movement of the film charges the spring for the shutter device: the film can be torn at the perforations formed in the film, in course of driving the driven sprocket wheel under the force applied via the film by a film winding mechanism. The film is sometimes not resistant to mechanical engagement of the film with the sprocket.

OBJECTS OF THE INVENTION

In view of the foregoing problems, an object of the present invention is to provide a consecutive taking camera of a simplified construction.

Another object of the present invention is to provide a consecutive taking camera in which both the shutter speed and the intervals between exposures can be separately predetermined.

A further object of the present invention is to provide a consecutive taking camera in which a displaceable mechanism for exposure operation can be easily and precisely positioned on standby for an exposure operation after one displacement performing the previous operation upon actuation of a shutter release mechanism.

SUMMARY OF THE INVENTION

In order to achieve the above and other objects and advantages of this invention, a sequential taking camera is provided with N taking lenses and adapted to create N imaging frames consecutively on photographic film by use of the taking lenses. A stationary plate is disposed behind the taking lenses. N stationary openings are formed in the stationary plate and associated respectively with the N taking lenses. External operating means is provided. Sequential actuating means is disposed behind the taking lenses for being displaced in response to a single operation of the external operating means, so as to render the N stationary openings effective sequentially. A shutter plate is disposed behind the taking lenses in slidable fashion. N shutter slits are formed in the shutter plate and associated respectively with the N stationary openings, and when the shutter plate is slid, move past the respectively associated stationary openings, so as to open and then close the stationary openings. Furthermore, at least one movable opening is formed in the sequential actuating means for being superposed on each of the stationary openings in order to render effective the stationary openings.

In accordance with the present invention, a consecutive taking camera can have a highly simplified construction. Both the shutter speed and the intervals between exposures can be predetermined separately. There is no variation between the frames as to the amount of light received by them.

Furthermore, biassing means biases the sequential actuating means from a position of starting displacement toward a position of final displacement, so as to displace the sequential actuating means in response to the operation of the external operating means. Reciprocating means is connected between the sequential actuating means and the shutter plate for sliding the shutter plate N times in forward and reverse directions, in response to the single displacement of the sequential actuating means. It follows that the shutter plate constituting the shutter device for consecutive photography can be charged independently of the film. The film never receives any load upon charging of the consecutive taking shutter device.

In a preferred embodiment, a projecting portion is disposed on disks constituting the sequential operating means. A first retaining member is formed integrally with the external operating means and lying in the path of the projecting portion when the external operating means is in the inactive position, in order to receive the projecting portion, so as to retain the disks in an initial position against the bias of the biassing means. The projecting portion is released from the first retaining member when the external operating means is displaced to the active position. A second retaining member is formed integrally with the external operating means and lying in the path of the projecting portion when the external operating means is in the active position, in order to receive the projecting portion after being released from the first retaining member and during displacement of the disks, so as to retain the disks substantially in the initial position against the bias of the biassing means.

The sequential actuating mechanism for exposure operation can be easily and precisely positioned on standby for an exposure operation after one displacement performing the previous operation upon actuation of the release mechanism.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
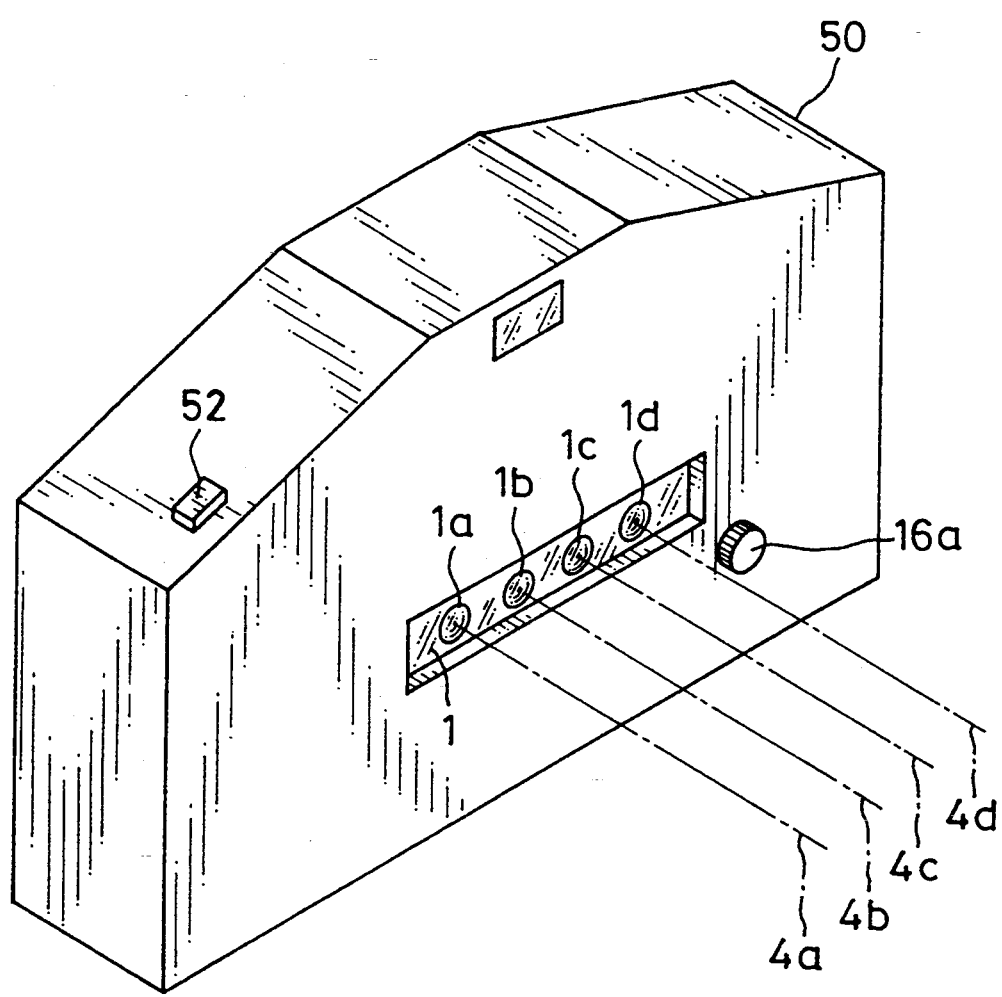
FIG. 1 is a perspective view illustrating a consecutive taking camera of the present invention.

In FIG. 1, illustrating a sequential taking camera of the present invention, there are shown four taking lenses $1a$ to $1d$ mounted on the front of a camera body 50. The taking lenses $1a$ to $1d$ are formed integrally with a lens plate 1, so as to maintain the four optical axes $4a$ to $4d$ of the lenses $1a$ to $1d$ parallel. The camera body 50 incorporates exposure chambers $35a$ to $35d$ one individual to each taking lens $1a$ to $1d$ so as to split a panoramic frame ($36 \times 13$ mm) into four imaging sub-frames $5a$ to $5d$ on photographic film 5, which is drawn from a photographic film cassette FC.

Figure 2:
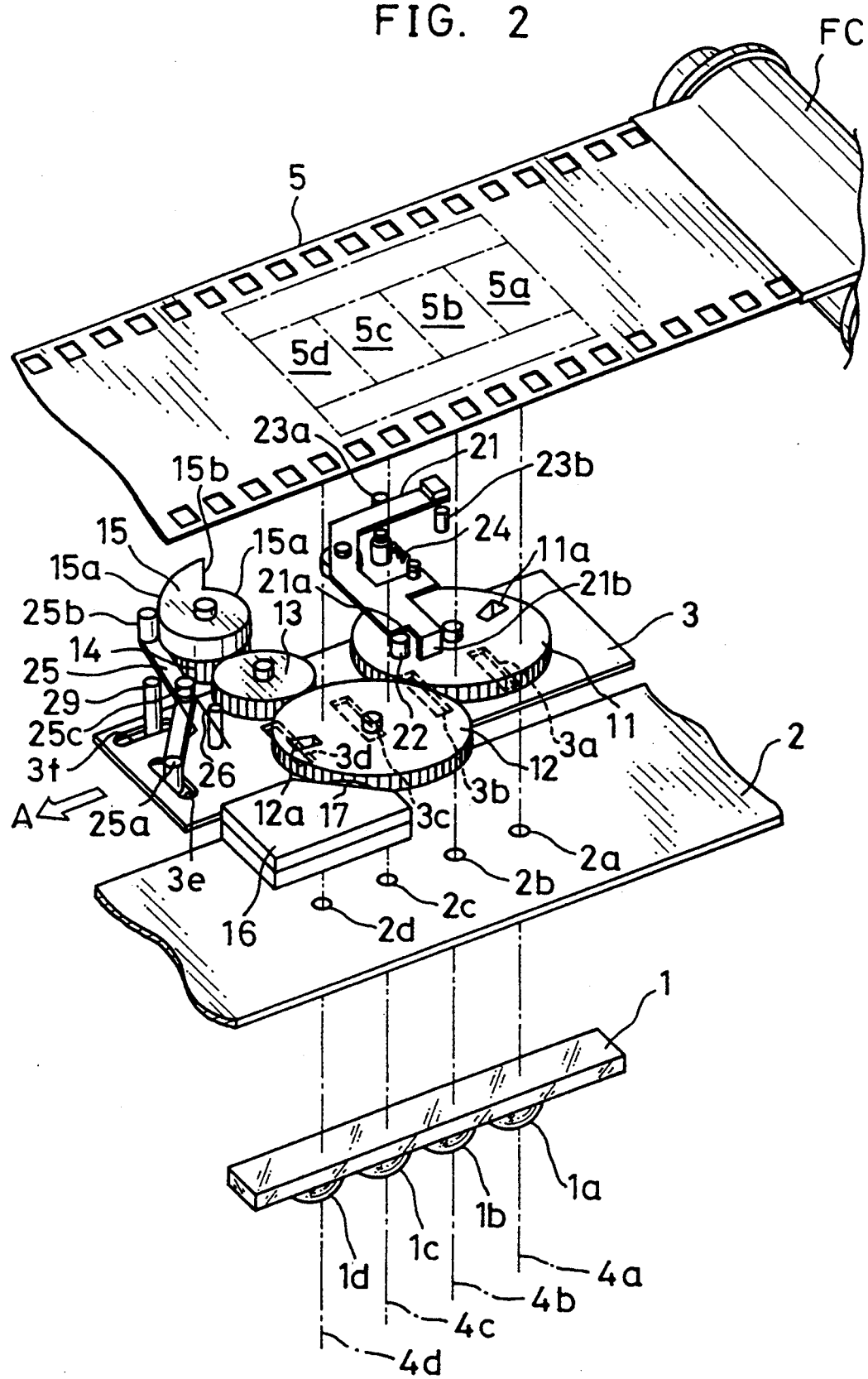
FIG. 2 is an exploded perspective view illustrating the shutter device of the camera in FIG. 1, showing the taking lenses and the photographic film.
Figure 3:
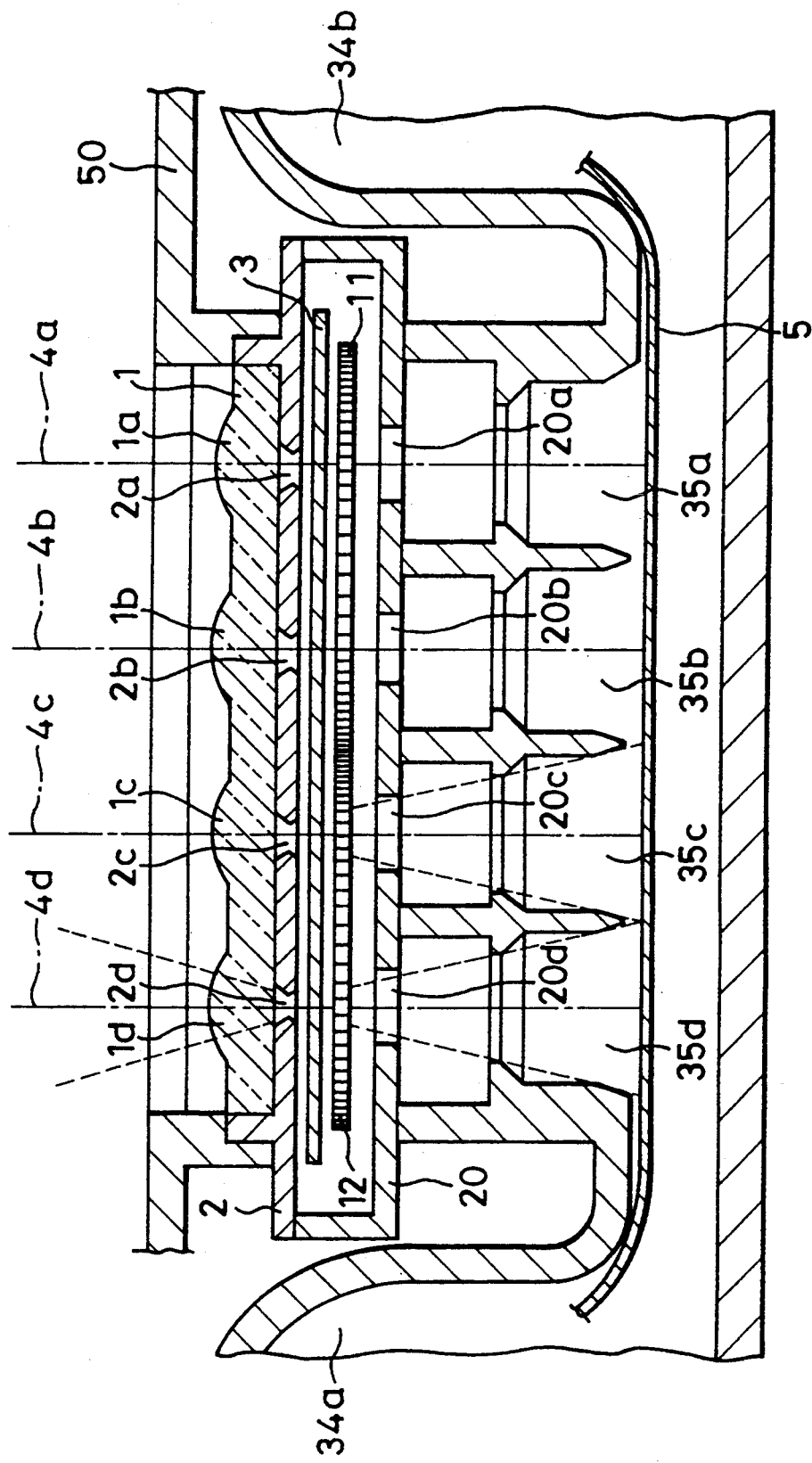
FIG. 3 is a fragmentary horizontal sectional view illustrating the shutter device.

As illustrated in FIGS. 2 and 3, a stationary plate 2 is fixedly mounted in the camera body 50. The stationary plate 2 has four stationary openings $2a$ to $2d$ provided with equal inner diameters and located behind the respective taking lenses $1a$ to $1d$. Behind the stationary plate 2 is disposed a single shutter plate 3, which has a slot $3f$ receiving a guide pin 29 such that the shutter plate 3 is maintained slidable in a horizontal direction. The shutter plate 3 has shutter slits $3a$ to $3d$ associated with the stationary openings $2a$ to $2d$. When the shutter plate 3 is slid, the shutter slits $3a$ to $3d$ are moved past the rear of the respective stationary openings $2a$ to $2d$.

Behind the shutter plate 3 are disposed toothed rotatable disks 11 and 12. The disks 11 and 12 are rotatably supported on a shutter base 20, and are in mesh with each other at a gear ratio of 1:1. Openings $11a$ and $12a$ are formed in the respective disks 11 and 12 and so rotate with disks 11 and 12. In the course of one rotation of the disks 11 and 12, the rotating opening $11a$ passes behind the stationary opening $2a$ and then $2b$, before the rotating opening $12a$ passes behind the stationary openings $2c$ and then $2d$. Thus, a single rotation of the disks 11 and 12 sequentially renders effective the light axes $4a$ to $4d$ through the stationary openings $2a$ to $2d$.

As a source of motion of the disks 11 and 12, a spiral spring housing 16 is provided, which contains a long leaf spring (not shown) coiled in plural turns, like a watch spring. The recovery force of the spiral spring in housing 16 is applied via a driven gear 17 engaged with the disk 12. The spiral spring thus drives the disks 11 and 12 in rotation. Before use of the film 5, an operating wheel $16a$, shown in FIG. 1, is rotated to charge the spiral spring fully. The full charge of the spiral spring is sufficient for the entire strip of film 5.

The disk 12 is further engaged with an intermediate gear 13, which in turn is in mesh with a driven gear 14 integral with a cam wheel 15. When the disk 12 rotates counterclockwise, the cam wheel 15 is rotated counterclockwise too. The gear ratio between 1.0 the disk 12 and the cam wheel 15 is 1:4, namely, the cam wheel 15 makes four rotations in the course of a single rotation of the disk 12. A reciprocating lever 25 has a driven end pin $25b$, which rides on the cam wheel 15. The reciprocating lever 25 is swingably supported on a rotatable shaft $25c$, and is biased by a spring 26 in a clockwise direction. The lever 25 also has a driving end pin $25a$, which is received in a slot $3e$ formed in the shutter plate 3.

The cam wheel 15 has a cam face $15a$ shaped as a helix and a stepped frame $15b$. When the cam wheel 15 is rotated counterclockwise, the reciprocating lever 25 is pressed by the cam face $15a$ and swung also counterclockwise relatively slowly against the bias of the spring 26. The drive pin 25a presses a right edge of the slot 3e as seen in the drawings, and shifts the shutter plate 3 relatively slowly to the right. Upon contact of the stepped face 15b with the reciprocating lever 25, the spring 26 causes the reciprocating lever 25 to swing abruptly in reverse, that is, clockwise. The drive pin 25a then presses against the left edge of the slot 3e, and shifts the shutter plate 3 to the left abruptly.

A release lever 21 is associated with the disks 11 and 12, and has retaining portions 21a and 21b formed at the lower end and arranged in a stair-stepped shape. A pin 22 is fixed on the disk 11 and comes into contact with either of the portions 21a and 21b. The release lever 21 is biased by a spring 24 in a counterclockwise direction, and is swingable over a range of movement defined between two stops 23a and 23b. When a driven end of the release lever 21 is depressed to swing clockwise (FIG. 6), the retaining portion 21a is released from the pin 22, so as to release the disks 11 and 12 for the operation of releasing the shutter device.

One rotation of the disk 12 cause the pin 22 to resume its initial position. When the release lever 21 remains subject to the bias of the spring 24 after the release of the disks 11 and 12, the retaining portion 21a again comes into contact with the pin 22, so as to stop the disks 11 and 12 from rotating. When the release lever 21 is kept swung by the depression after the release of the disks 11 and 12, the other retaining portion 21b in turn lies in the path of the pin 22. The retaining portion 21b comes into contact with the pin 22 slightly before disks 11 and 12 complete one rotation, so as to stop the disks 11 and 12 from rotating. The release lever 21 can be left biased by the spring 24 after stopping the pin 22 by contact with the retaining portion 21b. The pin 22 on the disk 12 makes a short further rotation, until the retaining portion 21a comes back into contact with the pin 22, which is stopped again. For actuating the release lever 21, a release button 52 is arranged on a top of the camera. When the button 52 is depressed, the release lever 21 is swung clockwise as seen in FIG. 2. When the button 52 is left untouched, the release lever 21 remains swung counterclockwise.

It is to be noted that the cassette FC is loaded inside a cassette containing chamber 34b. The film 5 drawn out of the cassette FC is contained as a roll in a supply chamber 34a. The four exposure chambers 35a to 35d are arranged in that order from the cassette containing chamber 34b to the supply chamber 34a. The light passing through the shutter device passes through respective openings 20a to 20d, which are formed in the shutter base 20. The rear of the chambers 65a to 65d forms four exposure apertures which respectively define the areas of the four sub-frames 5a to 5d.

The panoramic frame (36×13 mm), constituted by the four sub-frames, has such a size that upper and lower portions in a frame of a 35 mm full size (36×24 mm) are masked from the full-size frame along the two longer horizontal sides. Note that the panoramic frame is printed as a photographic print of panoramic format (254×89 mm), which corresponds to a size of two consecutive photo prints of an L size (127×89 mm), namely a format in which the full-size frame is frequently printed in any event.

Figure 4:
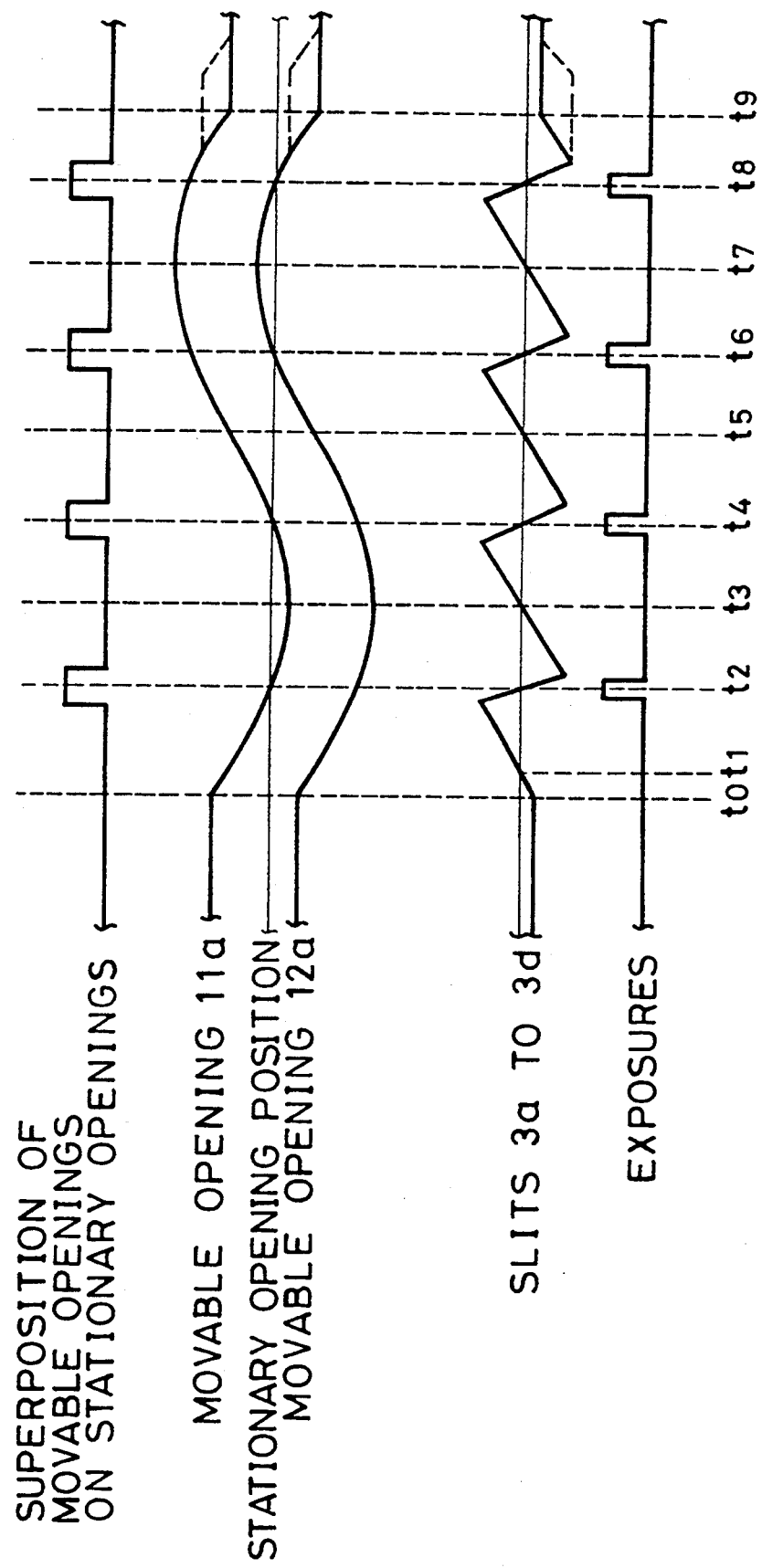
FIG. 4 is a timing chart illustrating the sequence of operation of the shutter device.
Figure 5:
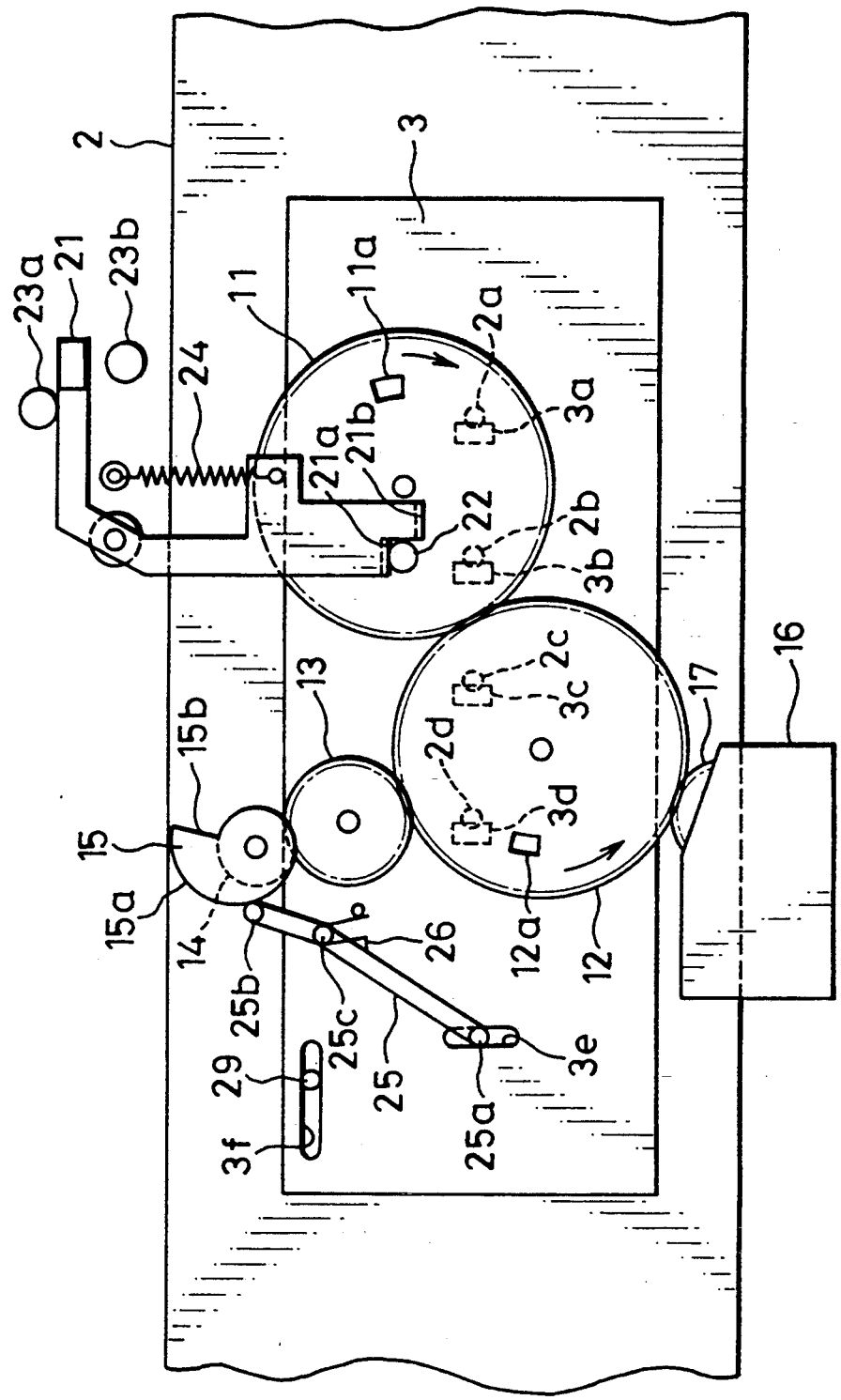
FIG. 5 is an explanatory view illustrating the initial state of the shutter device.
Figure 6:
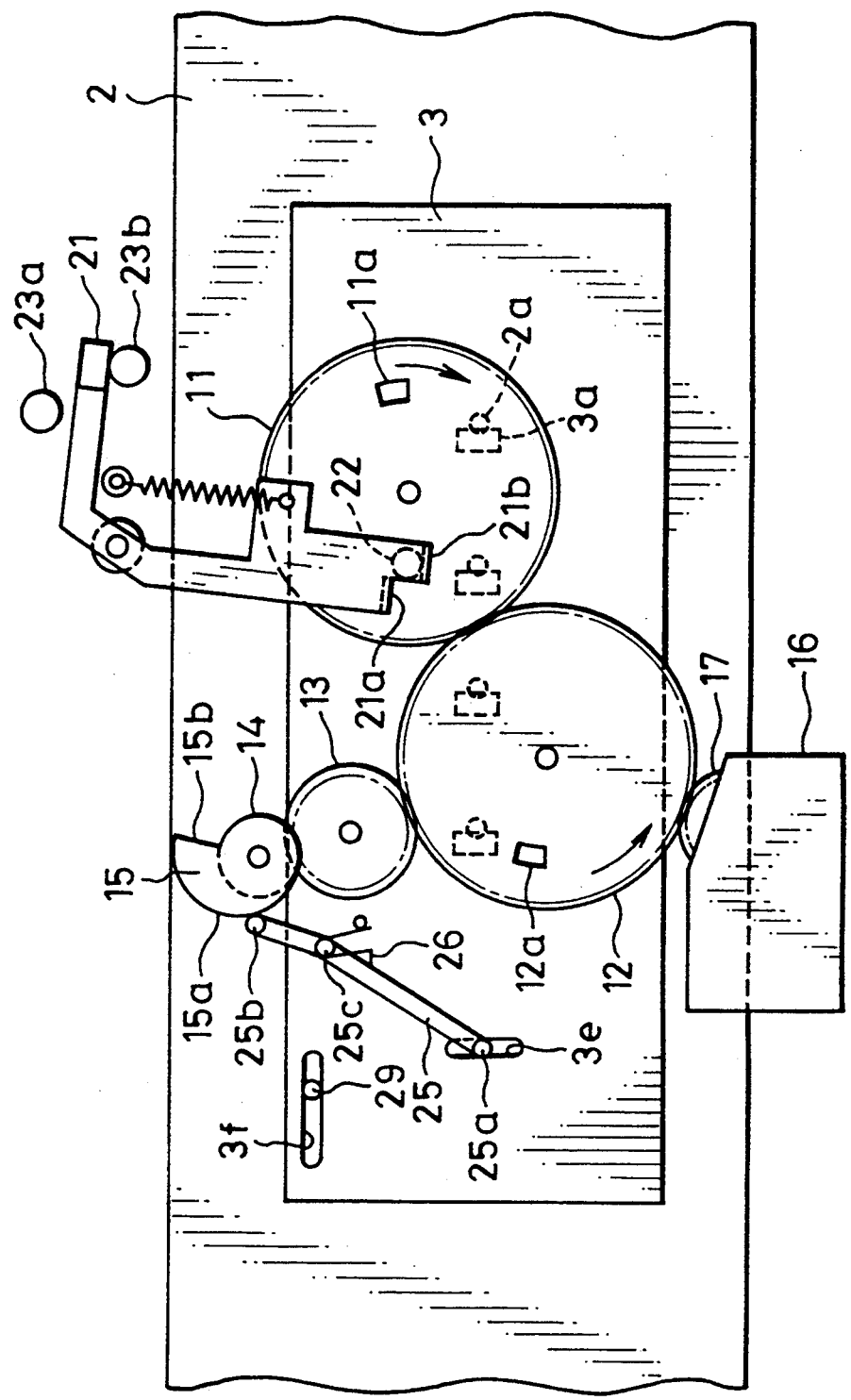
FIG. 6 is a view similar to FIG. 5 but showing the parts in their position at the beginning of depression of the release button.

The operation of the shutter device will now be described, referring to FIGS. 4 to 11. The disks 11 and 12 and the shutter plate 3 are time-sequentially controlled as illustrated in FIG. 4, so as to make exposures by superposition of the rotatable openings 11a and 12a and the shutter slits 3a to 3d, as will be described hereinafter. When the time T=t0 in FIG. 4, the release button 52 is depressed. The retaining portion 21a is swung away from the pin 22, which is released therefrom and passes through a gap between the retaining portions 21a and 21b. The disk 11 is released from retention by the release lever 21. The disks 11 and 12, positioned initially as depicted in FIG. 5, start rotation in the respectively arrowed directions, biased by the spiral spring in housing 16, as depicted in FIG. 6. Driven by the disks 11 and 12, the cam wheel 15 is rotated counterclockwise.

Figure 7:
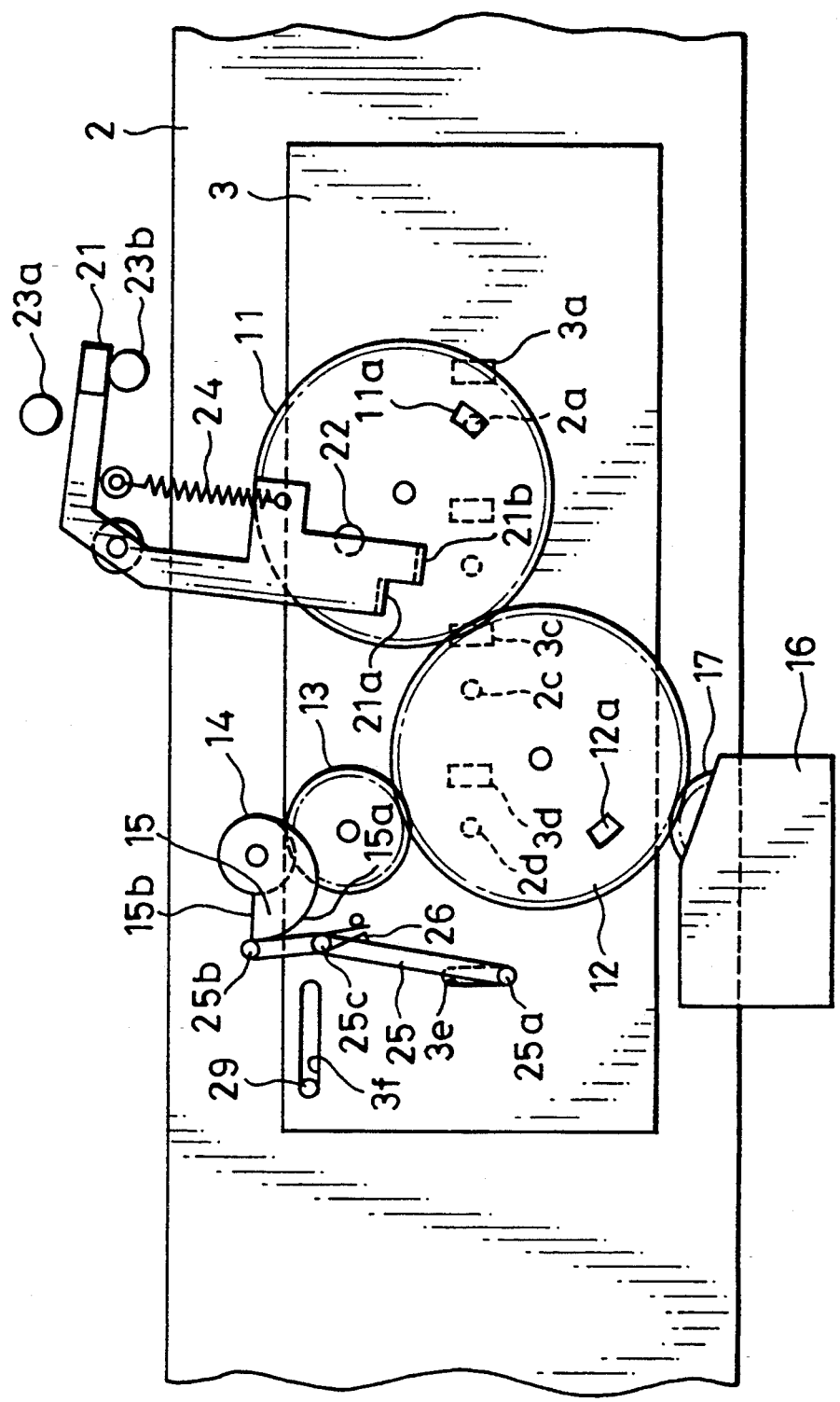
FIG. 7 is a view sequential to FIGS. 5 and 6, showing the parts at the end of charging the shutter plate and slightly before exposure.

In FIG. 7, the driven pin 25b is pressed by the cam face 15a. The reciprocating lever 25 is rotated counterclockwise against the bias of the spring 26. The drive pin 25, received in the slot 3e, presses the edge of the slot 3e toward the right, so as to slide the shutter plate 3 to the right inside the camera, until the shutter plate 3 is charged or cocked. In the course of rotation of the disks 11 and 12, the rotating opening 11a moves to the rear of the stationary opening 2a. Just upon superposition of the rotating opening 11a on the stationary opening 2a, the shutter plate 3 becomes completely charged. The shutter plate 3 stops moving to the right. The spring 26 causes the driven pin 25b to move abruptly along the stepped face 15b, so as to slide the shutter plate 3 abruptly to the left.

Figure 8:
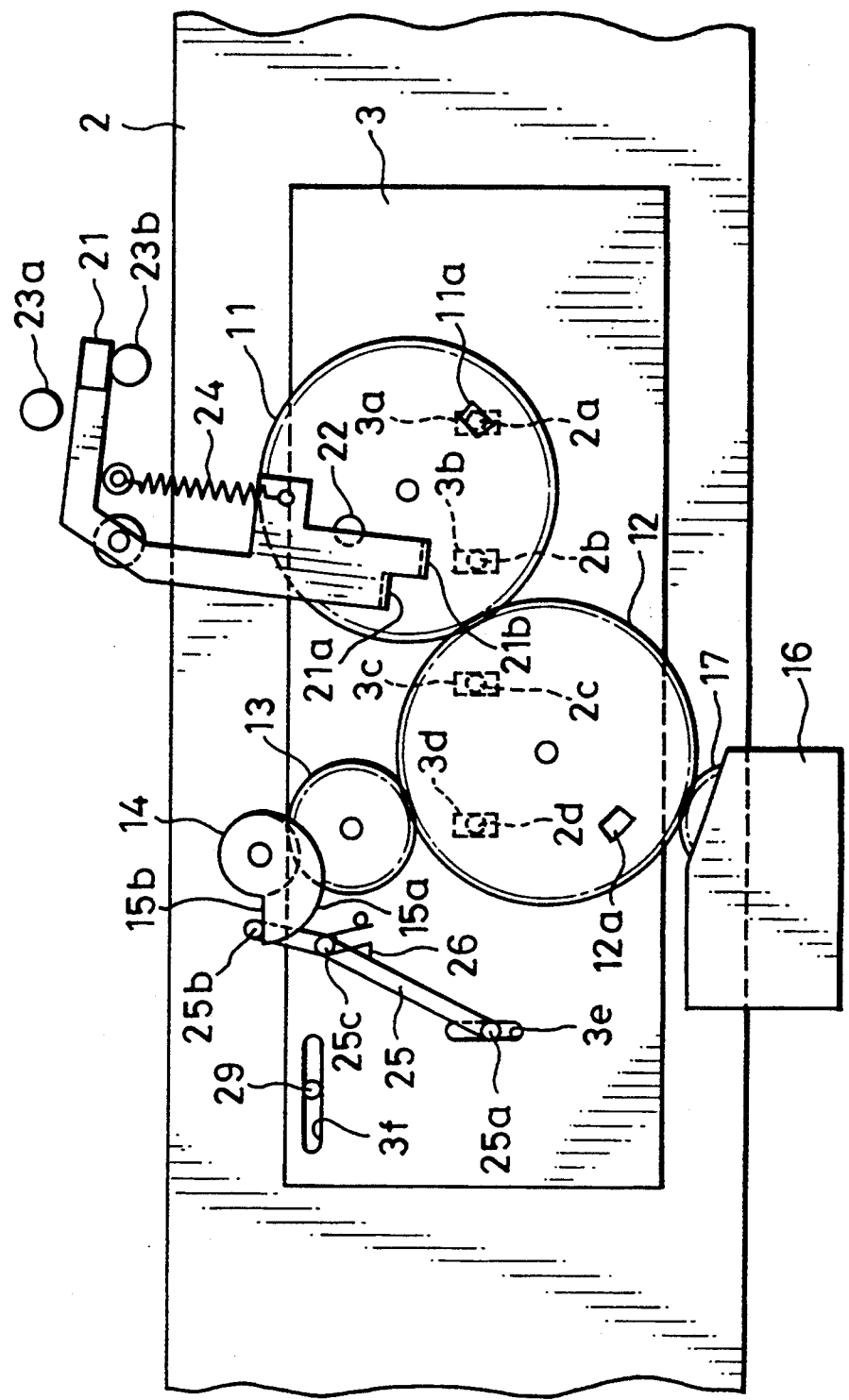
FIG. 8 is the next sequential view showing the parts during exposure.
Figure 9:
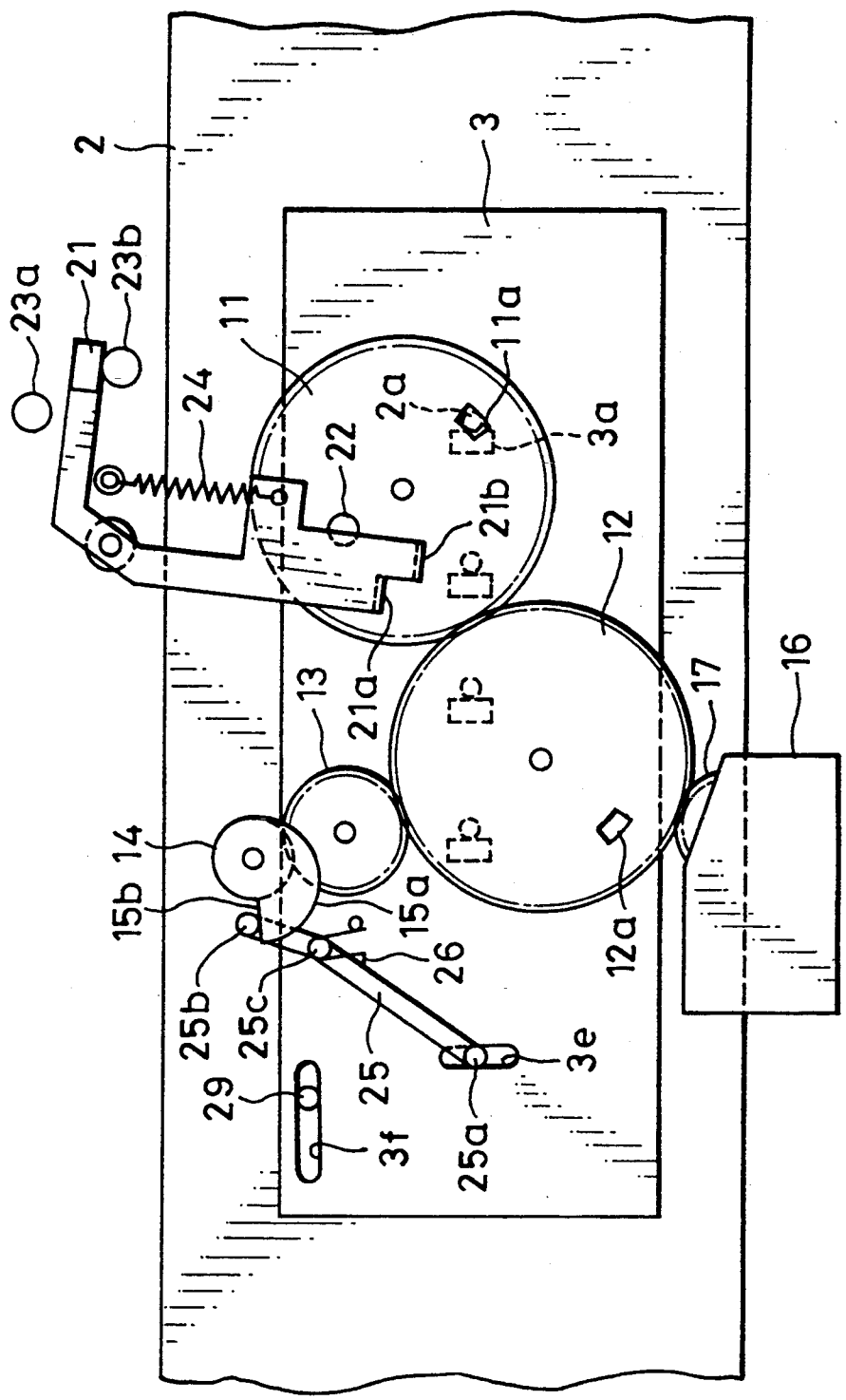
FIG. 9 is the next sequential view illustrating the parts at the end of the first exposure and during the abrupt movement of the shutter plate.

The shutter slit 3a, when T=t2, is momentarily superposed on both stationary opening 2a and rotating opening 11a as depicted in FIG. 8. The shutter slit 3a is between them as depicted in FIG. 9. Upon superposition of the stationary opening 2a on the rotating opening 11a and the shutter slit 3a, light from the photographic subject passing through the taking lens 1a exposes the film 5, so as to create the exposed sub-frame 5a.

Note that, when T=t1 upon charging the shutter plate 3, the four shutter slits 3a to 3d also pass behind the respective stationary openings 2a to 2d. However, none of the four sub-frames 5a to 5d behind the stationary openings 2a to 2d is exposed, because the rotating openings 11a and 12a are completely out of registry with the rear of the stationary openings 2a to 2d. It is also to be noted that, when T=t2 while exposing the sub-frame 5a, the three shutter slits 3b to 3d are also disposed behind the associated stationary openings 2b to 2d. However, none of the sub-frames 5b to 5d behind the stationary openings 2b to 2d is exposed, because the rotating openings 11a and 12a are completely out of registry with the rear of the stationary openings 2b to 2d.

Figure 10:
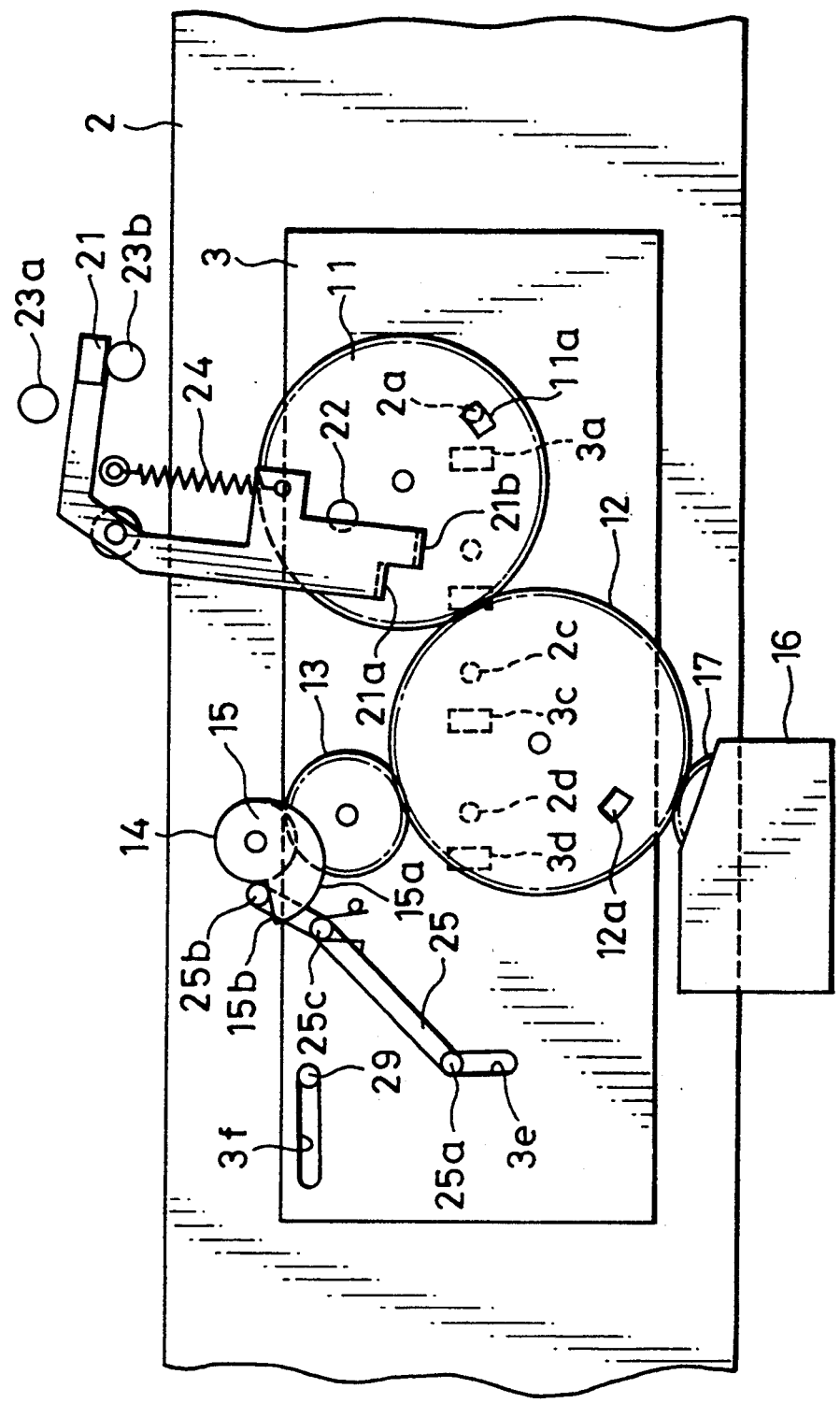
FIG. 10 is the next sequential view illustrating the parts at the end of the abrupt movement of the shutter plate.
Figure 11:
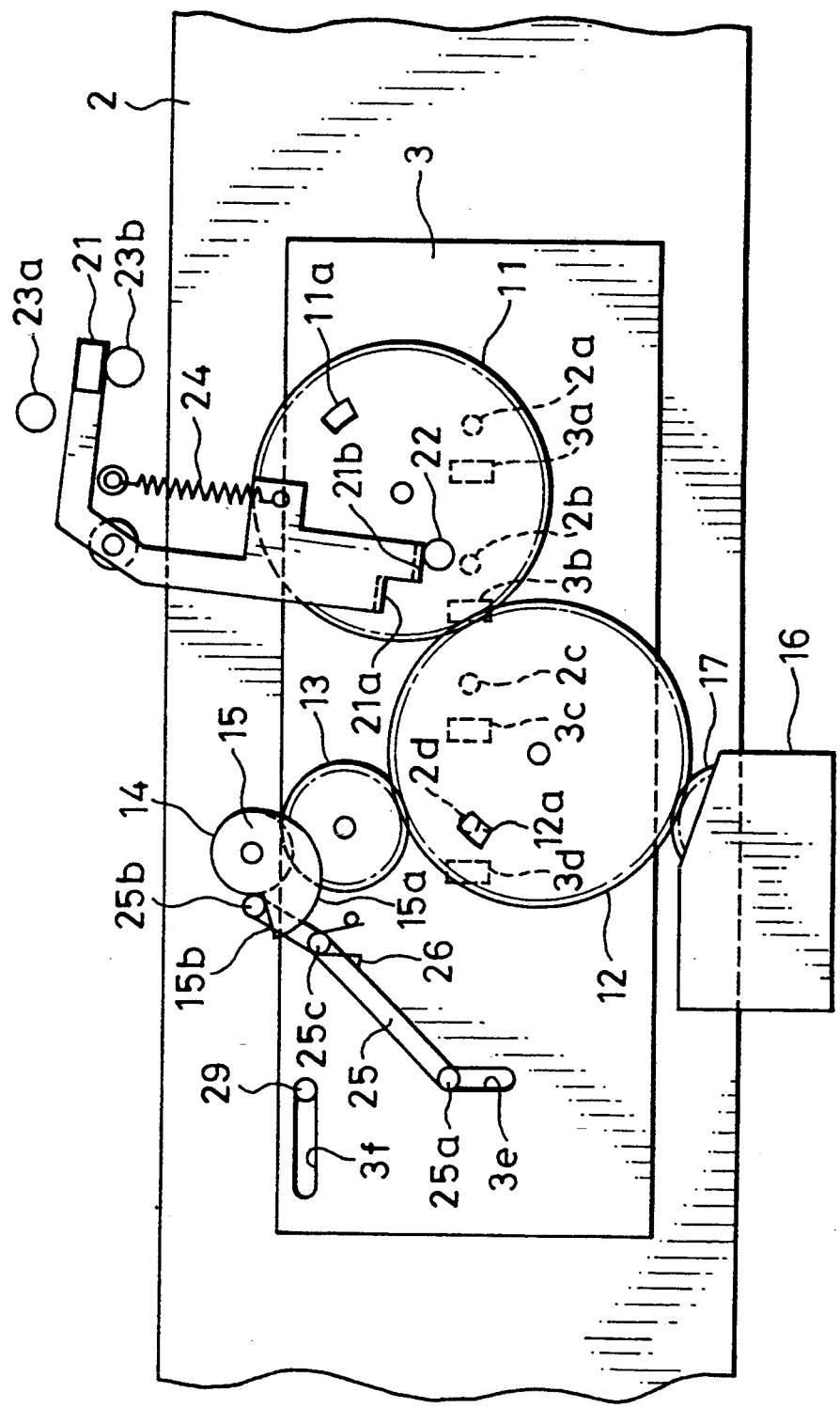
FIG. 11 is the next sequential view illustrating the parts substantially at the end of the single rotation of two disks, with the release button kept depressed.

As depicted in FIG. 10, the driven pin 25b moves along the stepped face 15b until it comes into contact with the cam face 15a. The movement of the shutter plate 3 to the left is stopped. The disks 11 and 12 are further rotated to rotate the cam wheel 15. The driven pin 25b is pressed by the cam face 15a. The reciprocating lever 25 is rotated counterclockwise. The drive pin 25 slides the shutter plate 3 to the left, until the shutter device is charged again.

The shutter plate 3 is charged for each of the three following exposures. Upon rotation of the disks 11 and 12, the rotating opening 11a is superposed on the stationary opening 2b, before the rotating opening 12a s superposed on the stationary openings 2c and then 2d. Thus, the rotating openings 11a and 12a sequentially render effective the stationary openings 2b, 2c and then 2d. During each time of superposition, one of the shutter slits 3b to 3d passes behind the associated stationary opening 2b to 2d, when T=t4, t6 and t8. The subject light through the taking lenses 1b to 1d exposes the sub-frames 5b to 5d.

Throughout the photography of all the four sub-frames 5a to 5d, the disks 11 and 12 are rotated at constant speed maintained by the spiral spring mechanism 16. Time intervals t4−t2, t6−t4 and t8−t6 are equal, so that the sub-frames 5a to 5d can be created in a regular time sequence. For each of the sub-frames 5a to 5d, the shutter plate 3 is charged and released, so that the sub-frames 5a to 5d can receive an adequate and predetermined amount of the subject light.

After the sub-frames 5a to 5d in the single panoramic frame are created the pin 22 is stopped by the retaining portion 21a to end the photography as depicted in FIG. 5, so as to place the camera in a standby condition for another operation of photography. If a photographer's finger still depresses the release button 52, the other retaining portion 21b contacts the pin 22 and stops the disks , 11 and 12 to end the photography, while the openings 11a and 12a and the shutter slits 3a to 3d follow the ending movement indicated by the broken lines at the right of FIG. 4. When the photographer removes his finger from the release button 52, the spring 24 swings the release lever 21 counterclockwise. The retaining portion 21b is separated from the pin 22, before the disk 11 rotates by the remaining small amount. The retaining portion 21a in turn contacts the pin 22 as illustrated in FIG. 4, so as to be in standby position for another operation of photography.

It follows that the sequential photography of the sub-frames 5a to 5d can be completed the same regardless of when the photographer stops depressing the release button 52. The disks 11 and 12 are in any case prevented from making more than one rotation. It has been highly difficult, in conventional cameras having one or two disks for sequential photography, to construct the disks precisely positionable in the standby condition for an exposure operation after one rotation of the disks performing the previous operation, in view of manual operation by the photographer when actuating a release button. In the present invention, however, the release lever 21 having both retaining portions 21a and 21b is advantageous, because the disks 11 and 12 can be easily and precisely positioned on standby for the next photography after one rotation of the disks 11 and 12. The photographer, after actuating the release button 52, is not required to pay attention to the point when he should remove his finger from the release button 52.

The entirety of the film 5 having been exposed, it is then developed and subjected to the production of photo prints. The finished photo prints, produced from the sequential sub-frames 5a to 5d, respectively, have four picture sub-frames arranged horizontally in the order of photography. The density of the negative images of the sub-frames 5a to 5d on the film 5 is substantially equal, so that there is no noticeable irregularity in exposure in the finished picture sub-frames produced from the sub-frames 5a to 5d. Another advantage is that the time interval between the exposures of the sub-frames 5a to 5d can be set to be long at the same time that the shutter speed can be set to be high. It follows that the obtained picture frames not only can cover a photographic sequence of long duration from the beginning to the end, but also can reproduce finished images of which the motion is apparently stopped.

Figure 12:
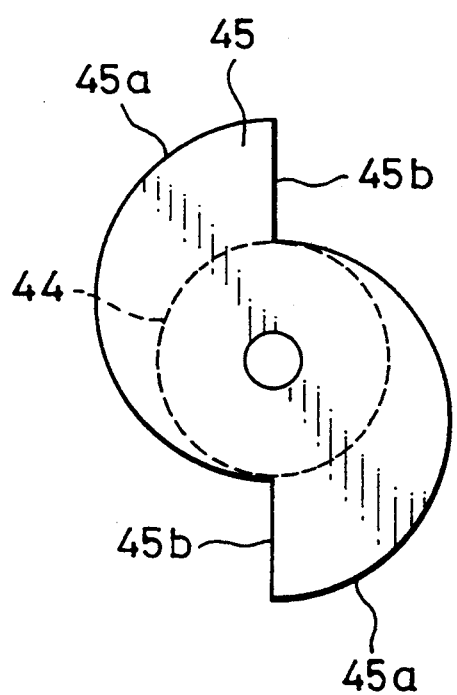
FIG. 12 is an elevational view illustrating another preferred cam wheel for driving the shutter plate.

FIG. 12 illustrates another preferred shape of a cam wheel 45 adapted to drive the shutter plate 3. The disk 12 is engaged with an intermediate gear, which in turn is in mesh with a driven gear 44 integral with the cam wheel 45. The ratio to the diameters of the disk 12 and the driven gear 44 is 2:1. The ratio of the speed of rotation to the disk 12 to the cam wheel 45 is 1:2, i.e., the cam wheel 45 makes two rotations during a single rotation of the disk 12. Reference numeral 45a designates cam faces, and 45b stepped faces. During the two rotations of the cam wheel 45, the shutter plate 3 is reciprocated four times, as in the first embodiment.

In the above embodiment, the four stationary openings 2a to 2d are formed, with the two disks 11 and 12 arranged side by side. The four sequential sub-frames 5a to 5d are created. Alternatively, the number of stationary openings may be increased. The number and arrangement of disks may be changed. The number of rotatable openings in such disks may be changed as required by the adaptation to the stationary openings. Five or more sub-frames may be created within a panoramic frame. A sequence of consecutive sub-frames may be split into two horizontal lines, which respectively include a plurality of sub-frames, and are contained together in a single frame of the 35 mm full size.

Note that the time interval between exposures of the sub-frames can be changed by exchanging a change gear train and/or speed governor incorporated in the spiral spring mechanism 16. The shutter speed can be set by adjusting the width of the shutter slits 3a to 3d, otherwise by adjusting the rotational radii of the drive end 25a and the driven end 25b of the lever.

In the above embodiments, the sequential taking camera is of a usual type reusable with newly loaded photographic film after unloading the photographic film that has been exposed. Alternatively, the present invention is applicable to a lens-fitted photographic film unit sometimes known as a single-use camera, which is pre-loaded with photographic film before a user purchases it. After he or she takes photographs therewith, the user forwards the single-use camera containing the exposed film to a photographic laboratory, without unloading the photographic film from the single-use camera. A photofinisher at the photographic lab unloads the film and performs photofinishing. The photofinisher then returns to the customer photographic prints as well as the exposed developed film. The single-use camera will be disassembled and at least partially recycled or reused and is not returned to the customer.

Note that, in view of the above embodiments, the single-use camera can lack the operating wheel 16a, because the spiral spring in housing 16 is pre-charged fully before sale and need have only a charge adequate for the single strip of the photographic film pre-loaded in the single-use camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A sequential taking camera provided with N taking lenses and having means defining N imaging frames consecutively on photographic film by successive use of said taking lenses, N being an integer greater than one, comprising:

a stationary plate disposed behind said taking lenses;

N stationary openings formed in said stationary plate and associated each with a respective one of said taking lenses;

sequential actuating means disposed behind said taking lenses and adapted to be displaced so as to render said N stationary openings effective sequentially to transmit light to expose said N imaging frames;

externally operable means for displacing said sequential actuating means to expose sequentially said N imaging frames upon a single operation of said externally operable means;

a shutter plate disposed behind said taking lenses in slidable fashion; and

N shutter slits formed in said shutter plate and associated respectively with said N stationary openings, said N shutter slits, when said shutter plate is slid, moving past said respectively associated stationary openings, so as to uncover and then cover said stationary openings sequentially as said stationary openings are sequentially rendered effective.

2. A sequential taking camera as defined in claim 1, further comprising at least one movable opening formed in said sequential actuating means for being superposed on each of said stationary openings in order to render effective said stationary openings.

3. A sequential taking camera as defined in claim 2, further comprising:

bias means for biasing said sequential actuating means from a position of starting displacement toward a position of final displacement, so as to displace said sequential actuating means in response to said operation of said externally operable means; and reciprocating means connected between said sequential actuating means and said shutter plate for sliding said shutter plate N times in forward and reverse directions, in response to said sequential actuating means being displaced.

4. A sequential taking camera as defined in claim 1, wherein said shutter plate is slid in a direction of arrangement of said N stationary openings.

5. A sequential taking camera as defined in claim 3, wherein said sequential actuating means includes first and second disks arranged in contact with each other and rotated simultaneously while driven by said bias means, and said movable opening is formed in each of said disks.

6. A sequential taking camera as defined in claim 3, wherein said shutter plate is slid gradually in said forward direction to be charged when said movable opening is away from all of said stationary openings, and slid rapidly in said reverse direction to perform exposure when said movable opening is superposed on one of said stationary openings.

7. A sequential taking camera as defined in claim 5, wherein said external operating means, when operated, is displaced from an inactive position to an active position; and which further comprises:

a projecting portion disposed on said disks;

a first retaining member formed integrally with said external operating means and lying in a path of displacement of said projecting portion when said external operating means is in said inactive position, in order to receive said projecting portion, so as to retain said disks in an initial position against bias of said bias means, said projecting portion being released from said first retaining member when said externally operable means is displaced to said active position; and a second retaining member formed integrally with said externally operable means and lying in said path of said projecting portion when said externally operable means is in said active position, in order to receive said projecting portion after being released from said first retaining member and during displacement of said disks, so as to retain said disks substantially in said initial position against said bias of said bias means.

8. A sequential taking camera as defined in claim 5, wherein said reciprocating means includes:

a cam member connected to one of said first and second disks and rotated by said one disk;

a reciprocating lever having a rotatably supported rotational shaft, a driven end portion driven by said cam member, and a drive end portion disposed opposite to said driven end portion with respect to said rotational shaft, said lever being swung by said cam member when said one disk rotates said cam member;

a slot formed in said shutter plate and extending in a direction across a sliding direction of said shutter plate; and a projection disposed on said drive end portion and received in said slot slidably, for driving an edge of said slot when said cam member drives said driven end portion, so as to slide said shutter plate.

9. A sequential taking camera as defined in claim 7, wherein said externally operable means includes:

an externally depressible release button; and a release lever swung to said active position in response to depression of said release button, and swung to said inactive position in response to release of said release button, said release lever carrying said first and second retaining members.

10. A sequential taking camera as defined in claim 8, further comprising:

a second slot formed in said shutter plate and extending in said sliding direction of said shutter plate; and a second projection disposed on said stationary plate and received in said second slot slidably, for cooperating with said second slot in order to guide said shutter plate in said sliding direction.

11. A sequential taking camera as defined in claim 7, wherein said first retaining member is disposed outside said second retaining member with respect to a radial direction of said path of said projecting portion.

12. A sequential taking camera as defined in claim 1, wherein said imaging frames respectively have a size of which a frame of a panoramic size is divided into N portions, and said panoramic frame has such a size that upper and lower portions in a frame of a full size are removed from said full-size frame along two longer horizontal sides of said full-size frame.

13. A sequential taking camera as defined in claim 1, wherein said sequential actuating means is disposed behind said shutter plate, and said shutter plate is disposed behind said stationary plate.

14. A sequential taking camera as defined in claim 1, wherein N=4.

15. A sequential taking camera provided with N taking lenses and having means defining N imaging frames consecutively on photographic film by successive use of said taking lenses, N being an integer greater than one, comprising:

a stationary plate disposed behind said taking lenses;

N stationary openings formed in said stationary plate and associated each with a respective one of said taking lenses;

externally operable means adapted to be displaced from an inactive position to an active position when operated;

rotor means disposed behind said taking lenses;

bias means for biasing said rotor means rotationally in order to rotate said rotor means in response to a single operation of said externally operable means;

at least one movable opening formed in said rotor means and adapted to be superposed on each of said stationary openings while said rotor means rotates, in order to render said N stationary openings sequentially effective to transmit light to expose said N imaging frames;

a projection portion disposed on said rotor means;

a first retaining member formed integrally with said externally operable means and lying in a path of rotation of said projecting portion when said externally operable means is in said inactive position, in order to receive said projecting portion, so as to retain said rotor means in an initial position against bias of said bias means, said projecting portion being released from said first retaining member when said externally operable means is displaced to said active position; and a second retaining member formed integrally with said externally operable means and lying in said path of said projecting portion when said externally operable means is in said active position, in order to receive said projecting portion after being released from said first retaining member and during rotation of said rotor means, so as to retain said rotor means substantially in said initial position against said bias of said bias means.

16. A sequential taking camera as defined in claim 15, further comprising:

a shutter plate disposed behind said taking lenses in slidable fashion; and

N shutter slits formed in said shutter plate and associated respectively with said N stationary openings, said N shutter slits, when said shutter plate is slid, moving past said respectively associated stationary openings, so as to uncover and then cover said stationary openings sequentially as said stationary openings are sequentially rendered effective.

17. A sequential camera as defined in claim 16, which further comprises reciprocating means connected between said rotor means and said shutter plate for sliding said shutter plate N times in forward and reverse directions, in response to a single rotation of said rotor means.

18. A sequential taking camera as defined in claim 17, wherein said shutter plate is slid gradually in said forward direction to be charged when said at least one movable opening is displaced from said stationary openings, and slid rapidly in said reverse direction to perform exposure when said at least one movable opening is superposed on said stationary openings.

19. A sequential taking camera as defined in claim 15, wherein said rotor means includes first and second disks arranged in contact with each other and rotated simultaneously while driven by said bias means, and said at least one movable opening is formed in each of said disks.

20. A sequential taking camera as defined in claim 15, wherein said externally operable means includes:

an externally depressible release button; and a release lever swung to said active position in response to depression of said release button, and swung to said inactive position in response to release of said release button, said release lever carrying said first and second retaining members.

21. A sequential taking camera as defined in claim 15, wherein said first retaining member is disposed outside said second retaining member with respect to a radial direction of said path of said projecting portion.

* * * * *